April 28, 1931.　　　　　E. T. HIER　　　　　1,802,916
AIR BRAKE RELEASE MEANS
Filed Oct. 22, 1929　　2 Sheets-Sheet 1
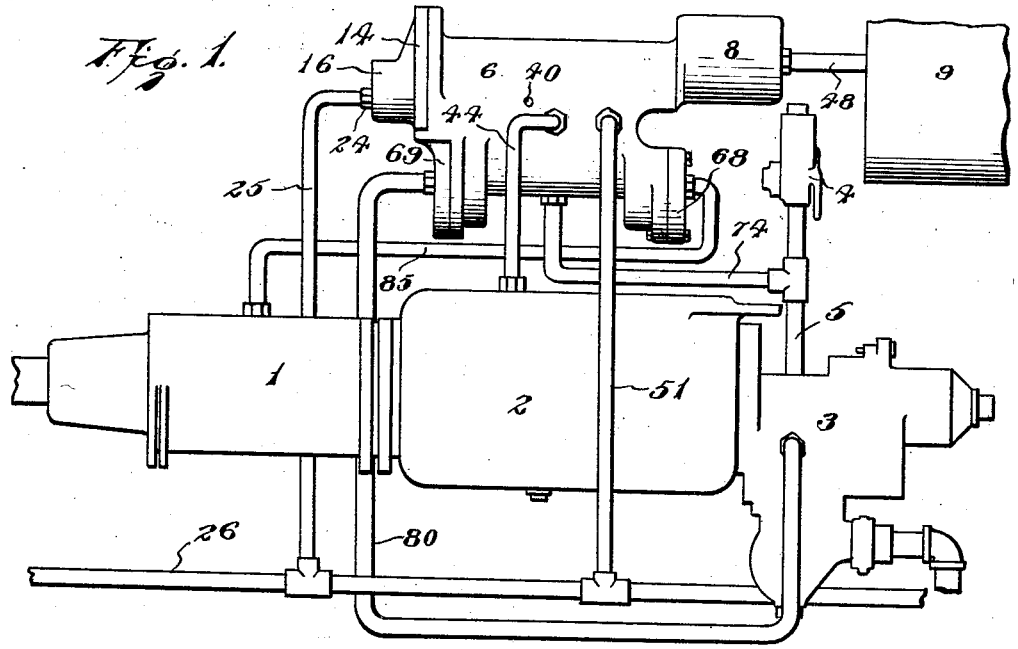
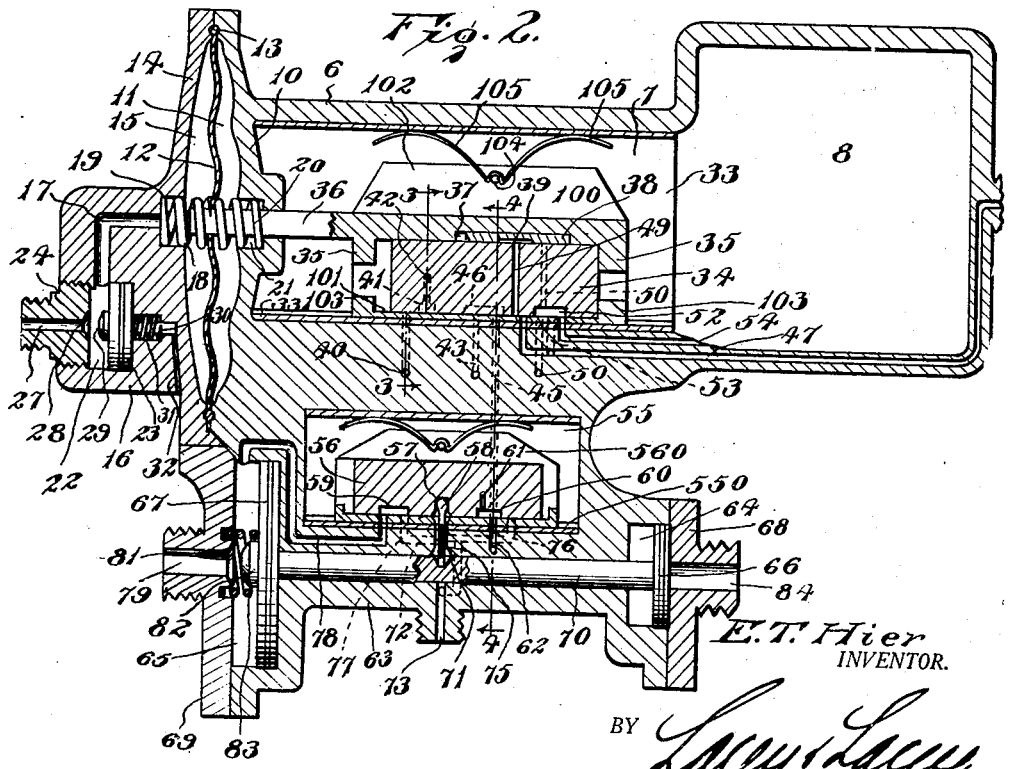
E. T. Hier
INVENTOR.
BY Lacey & Lacey
ATTORNEYS April 28, 1931. E. T. HIER 1,802,916
AIR BRAKE RELEASE MEANS
Filed Oct. 22, 1929 2 Sheets-Sheet 2
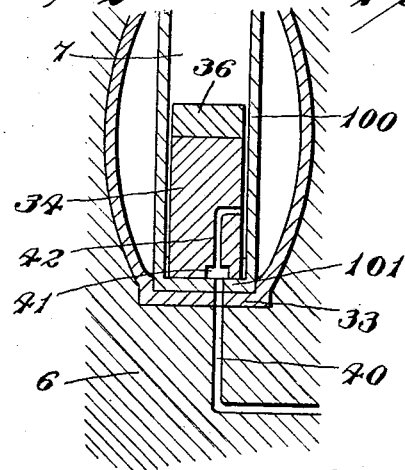
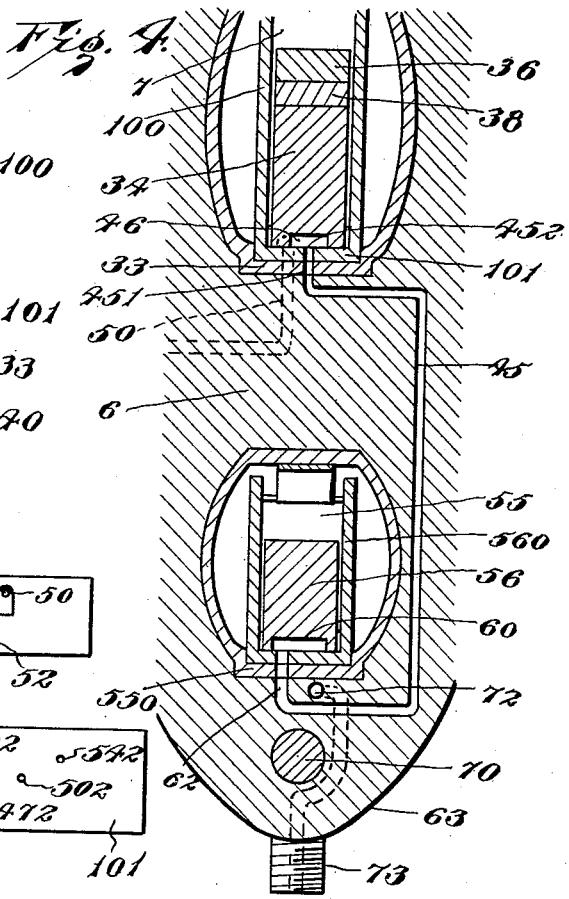
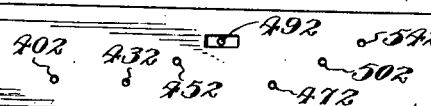
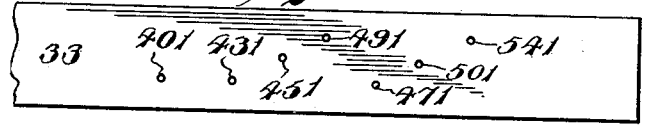
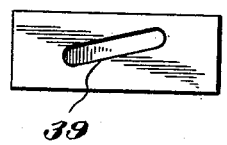
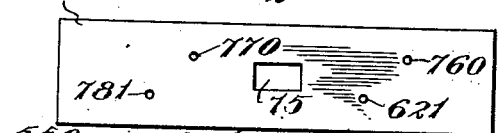
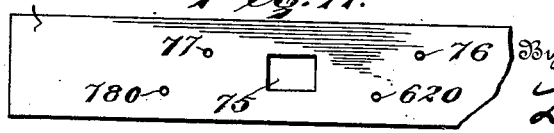
Inventor
E. T. Hier
By Lacey Lacey
Attorneys Patented Apr. 28, 1931

1,802,916

UNITED STATES PATENT OFFICE

ELVET T. HIER, OF MARCELINE, MISSOURI

AIR-BRAKE-RELEASE MEANS

Application filed October 22, 1929. Serial No. 401,506.

The object of this invention is to provide means whereby car brakes may be fully released notwithstanding that the triple valve slide has failed to move to release position. It frequently happens that the pressure in the brake pipe or train line is built up slowly and the air feeds over the triple valve piston and builds up in the auxiliary reservoir at the same rate as it does in the brake pipe and, notwithstanding that the brake pipe pressure has been raised to the standard pressure, the triple valve piston fails to move to release position so that the air in the brake cylinder is not released and the brakes on the car are held applied. It also frequently happens that the brake pipe becomes overcharged, whereupon a service application is made and as many of the brakes are released as possible, but often the engineer's gage will register a restoration of the brake pipe pressure and from all indications all brakes are released but, notwithstanding these indications, there are some overcharged auxiliaries somewhere in the train and the brakes on those cars are stuck. These stuck brakes can be released only by manually holding the bleeder valve open or by cutting out the car having said brakes. My invention provides means whereby these conditions are overcome automatically and the engineer is assured of full release of all functional brakes. The invention is illustrated in the accompanying drawings and will be hereinafter fully set forth.

In the drawings:

Figure 1 is an elevation showing the invention applied in its relation to the auxiliary reservoir, the brake cylinder, the triple valve and the pressure retainer, Fig. 2 is a vertical longitudinal section through the apparatus constituting the present invention, Fig. 3 is an enlarged detail section on the line 3—3 of Fig. 2, Fig. 4 is a similar view on the line 4—4 of Fig. 2, Figs. 5, 6, 7 and 8 are bottom plan views of the slide block valve, the movable liner, the stationary bushing, and the auxiliary slide valve, respectively, in the upper chamber, and Figs. 9, 10 and 11 are similar views of the slide valve, movable liner and stationary liner in the lower chamber.

Referring more particularly to the drawing, the reference numeral 1 indicates the brake cylinder, the numeral 2 designates the auxiliary reservoir, and the numeral 3 designates the triple valve all of standard construction and arrangement. The numeral 4 indicates the pressure retainer which is connected by a pipe 5 with the triple valve.

In carrying out the present invention, there is provided a body 6 which is constructed to define a chamber 7 in its upper portion which communicates directly with a larger chamber 8 at one end and there is also provided a tank 9 which is intended to maintain a reserve supply of air to be put in communication with the chambers 7 and 8, as will be presently set forth. The capacity of this reserve tank should be at least equal to the total air confining capacity of the entire brake rigging under the car having the apparatus mounted thereon. Across the end of the body 6 remote from the chamber 8 is constructed a web 10 defining a recess 11, and extending over said recess is a diaphragm 12 which is preferably of the corrugated form shown in Fig. 2, whereby it will have a greater area for a given working diameter than a diaphragm which is preferably flat. This diaphragm has its margin seated in the outer end wall of the body 6, as shown at 13, and it is held in place by a head or cap 14 fitting over its margin and secured to the body by bolts or cap screws in a well known manner. The cap or head 14 is arcuate in cross section to define a chamber 15 on its inner side with the diaphragm disposed normally centrally between said chamber and the recess 11. Upon the outer side of the cap or head 14 is an enlarged projection 16 having a passage 17 therein which leads to the chamber 15, as shown in Fig. 2, an expansion spring 18 being seated in a socket 19 at one end of the passage 17 and bearing against the end of the said socket and against the diaphragm, as shown. At the opposite side of the diaphragm is an expansion spring 20 which bears against the diaphragm and seats in a socket 21 formed in the web 10, as shown in Fig. 2, the tension of the springs 19 and 20 being equal. The outer end of the passage 17 communicates directly with a cylinder or chamber 22 formed in the projection 16, and a piston 23 is disposed in said cylinder or chamber. In the outer end of said chamber is a plug 24 which is connected by a tube or pipe 25 with the brake pipe 26. A bore 27 is formed centrally through the plug 24 to establish communication between the brake pipe and the chamber 22 and the end of this bore is flared, as shown at 28, to provide a seat for a valve 29 formed on the outer side of the piston 23. At the inner side of the piston 23, an expansion spring 30 is fitted in a socket 31 formed in the projection 16, and a vent 32 connects said socket with the atmosphere.

The wall of the chamber 7 has fitted thereto a liner 33 and within the chamber is a slide valve 34 having a slight play between lugs 35 on a stem 36 which extends through the web 10 and is connected to the diaphragm 12 coaxially with the springs 19 and 20. Between the lugs 35, a cavity 37 is formed in the under side of the stem 36 and a small block or auxiliary valve 38 is mounted freely in said cavity to rest upon the valve 34, as shown in Fig. 2. In the under side of the auxiliary valve 38 is a groove 39 which at times establishes communication between ports presently referred to. Opening through the bottom of the chamber 7 and extending through the side of the body 6 below said chamber is a port or passage 40 which opens into the atmosphere, and in the bottom of the slide valve 34 is a recess 41 and a port 42 leading therefrom through the side of the valve to establish communication with the chamber 7. In the position shown in Fig. 2, the recess 41 is blanked and the port 40 is also blanked but in the operation of the apparatus the recess 41 will at times register with the port 40 so that communication between the chamber 7 and the outside air will be established. There is also a port 43 leading from the bottom of the chamber 7 through the side of the body 6 and this port is connected by a pipe 44 with the auxiliary reservoir 2. Adjacent the port 43 a port or passage 45 is formed in the body 6 and this port is adapted to be connected with the port 43 by a groove or recess 46 in the under side of the slide valve 34. Continuing to read Fig. 2 of the drawings toward the right, a port or passage 47 is formed in the body 6 and opens through the bottom of the chamber 7 and leads from said chamber through the intermediate portion of the body and the wall of the chamber 8 to the reserve tank 9 which is connected with the side of the chamber 8 through a pipe 48. A passage 49 is formed through the valve 34 and is adapted at times to register with the passage 47 and communicate with the recess 39 in the under side of the auxiliary slide valve 38. A passage 50 is formed through the valve 34 adjacent the passage 49 and, in some positions of the valve and of the auxiliary valve 38, the upper end of the passage 50 will communicate through the recess or groove 39 with the passage 49, the lower portion of said passage 50 extending through the side of the body 6 and being connected by a pipe 51 with the brake pipe 26. There is also an irregular recess 52 in the under side of the valve 34 around the end of the passage 50 which is adapted at times to register with a branch 53 leading from the passage 47 and to establish communication through the recess 52 between said branch and a passage 54 leading into the chamber 8. The stationary liner 33 is provided with a port 401 registering constantly with the passage 40 and forming the terminal of the same, and it is also provided with ports 431, 451, 491, 471, 501 and 541 which form terminals for the passages 43, 45, 49, 47, 50 and 54, respectively. The slide valve or block 34 is disposed within a carrier 100, the bottom 101 of which rests on and is guided by the liner 33 and is provided with ports 402, 432, 452, 492, 472, 502 and 542 corresponding to the ports 401, 431, 451, 491, 471, 501 and 541, respectively. The valve 34 rests directly on the bottom 101, which may be called a movable liner, and has a sliding movement thereon between the sides of the carrier which movement is limited by lugs 103 at the ends of the carrier. The sides of the carrier project above the stem 36, as shown at 102, and near the upper edges a rod 104 is secured in and extends between the sides, spring arms 105 being fitted on said rod and frictionally engaging the roof of the chamber 7 to retain the carrier in a set position with the ports in its bottom registering with the ports in the liner 33.

Below the chamber 7 in the body 6 is a chamber 55 having a slide valve 56 mounted therein. This slide valve has a socket or recess 57 in its under side at its center to receive a rocking arm or lever 58 which is fulcrumed between its ends on the bottom liner 550 and which will be presently more specifically mentioned. In the under side of the slide valve 56 at one side of its center is a recess 59 and at the opposite side of its center a recess 60 is formed in the bottom of the valve, a port 61 being formed through the valve 56 to establish communication between the chamber 55 and the recess 60. A port or passage 62 is formed in the body 6 below the chamber 55 and opens through the bottom of said chamber and is in direct communication with the port 45 so that, in some positions of the parts, there will be a direct communication between the chamber 55 and the auxiliary reservoir. In the ends of the lower portion 63 of the body 6 are cylindrical chambers 64 and 65 which are of different diameters and in which are slidably mounted pistons 66 and 67 respectively. These cylindrical chambers are closed by heads 68 and 69 secured over their open outer sides respectively, and the pistons 66 and 67 are connected by a piston rod 70 which extends through the lower extension 63 of the main body and is provided in its upper side at its center with a recess or socket 71 in which is seated the lower end of the rocking arm or lever 58. A passage 72 leads from the bottom of the chamber 55 to a port 73 extending through the bottom of the main body and connected by a pipe 74 with the pressure retainer 4. A passage 75 is formed in the bottom portion of the main body 6 and through the liner and the valve carrier to accommodate the oscillation of the lever 58 which extends therethrough. The ends of the passage 72 are at opposite sides of the passage 75 and communicate directly with the ports 76 and 77 in the liner 550. The valve 56 is mounted in a carrier 560, similar to the carrier 102, having ports 781, 770, 760 and 621 in its bottom corresponding to and adapted to register with the ports 780, 77, 76 and 620 in the liner, respectively. The port 780 is at the end of the passage 78 extending through the body 6 to open into the chamber 65 at a point between the piston 67 and the outer side of the chamber. As shown in Fig. 2, the passage 78 may communicate with the recess 59 in the bottom of the valve 56 and through said recess, with the passage 72. The recess 60 in the valve will, at times, establish communication between the ports 61, 62 and 76. The head 69 which closes the outer side of the chamber 65 has a central bore 79 and a pipe 80 is connected to the head to establish communication between said bore and the exhaust port of the triple valve. The bore 79 has its inner end flared, as shown at 81, and upon the piston 67 is formed a valve 82 adapted to fit in said seat, an expansion spring 83 being disposed between the piston and the head, as shown. The cap 68, closing the outer side of the chamber 64, has a central bore 84 and this bore is in communication through a pipe 85 with the brake cylinder.

It will be understood that when the pressure in the brake pipe is reduced below the tension of the spring 30, the spring will expand and the piston 23 will be moved outwardly so that its valve 29 will rest in the seat 28 and an air-tight closure of the brake pipe connection will result. It will also be understood that the piston 66 is directly responsive to the pressure in the brake cylinder and when the pressure in the brake cylinder overcomes the tension of the spring 83 and the pressure upon the piston 67, the differential pistons 66, 67 will be moved to the left in Fig. 2 and the arm 58 thereby rocked so as to shift the valve 56 to the right. When the brake pipe pressure has been raised sufficiently to overcome the tension of the spring 30, the piston 23 is forced rearwardly and the brake pipe pressure is permitted to enter the chamber 15 and bear against the diaphragm 12. Any increase of the pressure in the chamber 15 forces the diaphragm, the stem 36 and the slide valves 38 and 34 rearwardly or inwardly. As the valve 34 moves inwardly or rearwardly, the passages 47 and 49 are connected and the passage 50 is open. Pressure from the reserve tank 9 will then flow through the ports 47, 49 and 50 so that an equalization of pressure in the brake pipe and in the reserve tank results. Further increase of pressure in the chamber 15 will connect the ports 43 and 45 and also connect the ports 50, 53 and 54, the connection through the ports 49 and 50 being maintained. When the brake pipe pressure has been restored to maximum, the pressure in the chambers 15, 7, 8 and the reserve tank 9 will be equalized and the spring 20, which has been compressed, will force the diaphragm, stem and valves to the initial normal position, whereupon the ports 47, 49, 50 and 54 and 40 and 42 are blanked. When a service application is made and the brake pipe pressure is reduced, the diaphragm moves forwardly or outwardly compressing the spring 18, the stem 36 drawing the slide valves forwardly and blanking all ports. When the valve has traveled far enough, the ports 41 and 40 are connected and any further reduction of the brake pipe pressure reduces the air in the chambers 7 and 8 at the same rate. When the service application has been made and the pressure is equalized, the spring 18 returns the diaphragm, stem and valves to the neutral position. The amount of play on the stem between the valve 34 and the shoulder of the stem is just enough to direct the connections between the ports 40 and 41 so that the chambers 7 and 8 will discontinue exhausting when the reduction is finished. In this position, all ports in the valve 34 are blanked and the play between the stem shoulder and the valve 38 is such that the shoulder will force the valve 38 to establish communication between the ports 49 and 50. When the brake pipe pressure is reduced, the brakes are applied and the pressure in the brake cylinder plays against the piston 66 and forces the piston 66 and the piston 67 forward compressing the spring 83 and, through the action of the rocking arm 58, as previously described, the valve 56 is moved rearwardly establishing connections between the port 62 and the auxiliary reservoir and the retainer, but the reservoir is prevented from wasting air as it is blanked at the port 45 by the valve 34. When the train line pressure is being restored, the brakes should be releasing but as long as the brakes are applied the port 62 connects the auxiliary reservoir with the pressure retainer. After the train line pressure has been restored five pounds, for instance, the ports 47 and 49, 50, 53 and 54 are connected and the maximum brake pipe pressure that has been stored in the reserve tank 9 rushes into the brake pipe and increases the pressure therein rapidly. This action is the same as a sudden jar and if it is sufficient to force the triple valve slide to release position, the air exhausts from the brake cylinder through the exhaust port of the triple valve into the chamber 65 where it acts with the force of the spring 83 to cause the piston 67 to move toward the right, breaking the port connection 62 and establishing the connection between the passages 78 and 77 so that the exhaust of the triple valve will be connected with the pressure retainer and the air will be exhausted normally. If the boost from the reserve tank 9 fails to release the brakes or if it does release them and, for some reason, they reset, the port connection 62 is held open and when the valve 34 causes the ports 43 and 45 to open, the air is automatically fed from the auxiliary reservoir through said ports, the auxiliary feed groove 62 and the retainer. Obviously, as soon as the auxiliary is bled sufficiently to cause the triple valve slide to remove to release position, the spring 83 plus the pressure in the chamber 65 forces the valve 56 to blank the auxiliary connection. Hence, when the triple valve is functioning properly, when the auxiliary reservoir is connected through the valve 34, it will be blanked at the valve 56 and when the connection is broken at the valve 34, the valve 56 connects with the auxiliary.

It will be noted that the valve blocks 34 and 56 as well as the supplemental valve 38 have some lost motion so that the device will not go into operation too quickly and the play between the block and the movable slide will permit the desired lead of the triple valve over the releasing device to be established.

Air from the brake pipe enters the bore 27 and, when its pressure overcomes the spring 30, passes into the chamber 15 to act upon the diaphragm 12. When the pressure in chamber 15 becomes greater than the pressure in the chambers 7 and 8, the stem and blocks 38, 34, are forced rearward and the spring 20 is compressed. At the start of the rearward movement, all ports are blanked but the ports 49 and 50 are connected. After the stem has been forced rearward, under a pressure of about five pounds, ports 47, 49 and 50 are connected through the recess 39, allowing the pressure from tank 9 to dump into the brake pipe and immediately boost the pressure therein and act as a sudden jar on the triple valve piston. As the brake pipe pressure increases, the diaphragm and stem continue to travel rearwardly, connecting the ports 50, 53 and 54 through recess 52, while ports 47, 49 and 50 maintain their connection.

When the brake pipe pressure is increasing, the brakes should be releasing. When the brakes are applied, piston 66 with the aid of rocker arm 58 forces block 56 to connect ports 76, 60 and 73. By means of groove 45, the auxiliary reservoir has a direct connection with the atmosphere. Consequently, when the brakes fail to release, the auxiliary reservoir is bled until the triple piston moves to release position, and the exhaust, playing on the piston 67, blanks the port connection 76, 60 and 73 and checks further waste of auxiliary pressure.

Having thus described the invention, I claim:

1. An apparatus for the purpose set forth comprising a body having a pressure chamber, a reserve pressure tank, a chamber at one end of the body having a diaphragm therein, a connection between said chamber and the brake pipe, a valve within the pressure chamber, and a connection between said valve and the diaphragm whereby variations in the brake pipe pressure will cause said valve to establish connections between the pressure chamber and the atmosphere, the pressure chamber and the reserve pressure tank and the pressure chamber and the auxiliary reservoir.

2. In an apparatus for the purpose set forth, a body having a pressure chamber therein, a chamber at one end of the body separated from the pressure chamber, a diaphragm in said chamber subject to pressure from the brake pipe, and springs disposed at opposite sides of the diaphragm and bearing thereon and of equal tension whereby whenever the pressure in the pressure chamber and the brake pipe equalize the diaphragm will be returned to neutral position.

3. In a device for the purpose set forth, a body having a pressure chamber therein, a slide valve in said chamber, a stem controlling said valve and having some relative lost motion, an auxiliary slide valve seated in the lower side of the stem and resting on the first-mentioned valve and having some relative lost motion, a diaphragm connected with the stem, and means for subjecting said diaphragm to brake pipe pressure.

4. An apparatus comprising a main body having an upper chamber therein, a lower chamber, valves in said chambers, means whereby the valve in the upper chamber will be responsive to brake pipe pressure, means whereby the valve in the lower chamber will be responsive to brake cylinder pressure, a reserve pressure tank, and means whereby the valves will establish communication between said reserve pressure tank and the upper chamber, between the upper chamber and the atmosphere and between the auxiliary reservoir and the atmosphere.

5. Apparatus for the purpose set forth comprising a main body having an upper chamber therein, connections between said chamber and the brake pipe and between said chamber and the auxiliary reservoir, a lower chamber, cylinders below said chamber at opposite sides of the main body, one of said cylinders being connected with the brake cylinder and the other of said cylinders being connected with the exhaust of the triple valve, pistons in said cylinders, a valve in the lower chamber of the main body, a valve in the upper chamber of the main body subject to brake pipe pressure, a rod connecting the pistons in the lower cylinders, a rocking arm connecting said rod with the valve in the lower chamber, and means whereby the valves will establish communication between the upper chamber and the atmosphere and exhaust the auxiliary reservoir.

In testimony whereof I affix my signature.

ELVET T. HIER. [L. S.]